US007490456B2

(12) United States Patent
Draisey et al.

(10) Patent No.: US 7,490,456 B2
(45) Date of Patent: Feb. 17, 2009

(54) METHOD AND APPARATUS FOR MAKING CAPSULES

(75) Inventors: Allan Draisey, Felpham (GB); Ryan Grimes, Southampton (GB); David John Smith, Romsey (GB); George Bernard Tidy, Swindon (GB)

(73) Assignee: Ingel Technologies Ltd., Marchwood (GB)

( * ) Notice: Subject to any disclaimer, the term of this patent is extended or adjusted under 35 U.S.C. 154(b) by 553 days.

(21) Appl. No.: 10/510,771

(22) PCT Filed: Apr. 1, 2003

(86) PCT No.: PCT/GB03/01417

§ 371 (c)(1),
(2), (4) Date: Oct. 12, 2004

(87) PCT Pub. No.: WO03/089302

PCT Pub. Date: Oct. 30, 2003

(65) Prior Publication Data

US 2005/0138899 A1 Jun. 30, 2005

(30) Foreign Application Priority Data

Apr. 13, 2002 (GB) .................................. 0208587

(51) Int. Cl.
*B65B 47/04* (2006.01)
(52) U.S. Cl. .................... 53/560; 53/454; 53/DIG. 2
(58) Field of Classification Search .................. 53/433, 53/454, 560, 453, 477, 559, 374.3, 374.4, 53/DIG. 2; 264/449, 493; 425/116, 237
See application file for complete search history.

(56) References Cited

U.S. PATENT DOCUMENTS

| 2,497,212 | A | * | 2/1950 | Donofrio | 53/443 |
| 3,269,088 | A | * | 8/1966 | Kath | 53/560 |
| 4,134,942 | A | * | 1/1979 | Mirr et al. | 264/418 |
| 4,281,763 | A | * | 8/1981 | Pace | 206/530 |
| 4,325,761 | A | * | 4/1982 | Pace | 156/69 |
| 4,599,125 | A | * | 7/1986 | Buck | 156/248 |
| 4,662,155 | A | * | 5/1987 | Chasman | 53/433 |
| 4,782,647 | A | * | 11/1988 | Williams et al. | 53/454 |
| 4,820,364 | A | * | 4/1989 | Graham | 156/69 |

(Continued)

FOREIGN PATENT DOCUMENTS

GB 908344 10/1962

(Continued)

*Primary Examiner*—Paul R Durand
(74) *Attorney, Agent, or Firm*—William H. Holt

(57) ABSTRACT

Capsules, for example for the delivery of pharmaceuticals, are produced from two films (18) of a water-soluble polymeric material, by deforming the films to form a multiplicity of recesses, and filling the recesses, using two adjacent rotary dies (14, 15; 42) with recesses (16) into which the films (18) are deformed. The dies (14, 15; 42) act as electrodes for welding the films together by dielectric welding to form filled capsules (30). The capsules (30) can be separated from the resulting web either by coating at least one of the dies (14) with an electrical insulator (21), or by transferring the web from the dies (14, 15; 42) to a second pair of dies which cut the capsules (30) free. The polymeric material may be gelatin, or a water-soluble cellulose derivative such as hydroxypropyl methyl cellulose, and may also contain a plasticiser.

4 Claims, 4 Drawing Sheets

U.S. PATENT DOCUMENTS

| | | | |
|---|---|---|---|
| 4,844,906 A * | 7/1989 | Hermelin et al. | 424/454 |
| 4,894,978 A * | 1/1990 | Schonmann et al. | 53/560 |
| 5,145,694 A * | 9/1992 | Brams | 425/174.8 R |
| 5,427,645 A * | 6/1995 | Lovin | 156/367 |
| 6,755,010 B2 * | 6/2004 | Draisey | 53/454 |
| 6,923,980 B2 * | 8/2005 | Draisey et al. | 424/439 |
| 6,949,154 B2 * | 9/2005 | Hochrainer et al. | 156/69 |

FOREIGN PATENT DOCUMENTS

| | | |
|---|---|---|
| WO | 00/19963 | 4/2000 |
| WO | 01/68032 | 9/2001 |

* cited by examiner

METHOD AND APPARATUS FOR MAKING CAPSULES

This invention relates to a process and an apparatus for forming capsules, for example for the delivery of pharmaceuticals, and also to the resulting capsules.

A variety of pharmaceuticals and other materials are delivered in capsules. Both liquid and particulate material may be enclosed in soft capsules, these capsules being made from films of a soft elastic polymer which are brought together between rotating dies that have cavities in their surfaces. The material to fill the capsules is supplied between the films as the films deform into the cavities; as the dies move the films come together and are sealed together by application of heat and/or pressure at the dies. This rotary die process is widely used for gelatin capsules, the dies simultaneously shaping, sealing and cutting out the capsules.

WO 01/68032 (Stanelco Fibre Optics) describes a way of using rotary dies to form capsules, in which a radio frequency voltage is applied between the dies, so that the films are bonded by dielectric heating. The conventional cutting technique is inapplicable in this case, because the dies must remain electrically insulated from each other. In one described option the dies are said to be close enough to leave a film thickness of between 10 and 20 µm around each capsule. It has been found that, in practice, it is difficult to maintain a narrow gap less than about 40 µm reliably, because of play in the bearings, inaccuracy in axle positions, and out-of-roundness in the dies (especially where the dies are to be replaceable).

According to the present invention there is provided a process for making capsules, the process using two films of a polymeric material, and the process comprising the steps of deforming the films to form a multiplicity of recesses between a pair of rotary welding dies, filling the recesses with a flowable filling material, welding the films together by dielectric welding at the rotary welding dies to form a multiplicity of enclosures and cutting the filled enclosures from the remaining parts of the films so as to form a multiplicity of capsules, wherein there is no metal-to-metal contact between the welding dies, and characterised in that either the welding and cutting occur at the same place, metal-to-metal contact between the dies being prevented by using at least one welding die whose external surface is coated with a non-porous electrical insulator, or alternatively the cutting occurs at a different place to the welding but the capsules remain located in recesses throughout their passage between the welding and the cutting steps.

Preferably the polymeric material is a water-soluble or digestible material. Other plastics materials may be used for some purposes.

The present invention also provides an apparatus for performing such a process.

The rotary welding dies act as opposed electrodes, to which the high frequency electrical supply is provided. The supply may in principle be at a frequency between 1 MHz and 200 MHz, usually between 10 MHz and 100 MHz, but stringent limits are imposed on any emitted radio waves. In practice therefore the choice of frequency may be more limited. For example the supply frequency may be 27.12 MHz, or 40.68 MHz. The electrical connections to both the rotary welding dies may by a capacitative coupling, or by sliding contacts for example with brushes.

Each rotary die may be substantially cylindrical, and rotate about a fixed axis of rotation, or the axes of rotation may be sprung loaded towards each other. Alternatively each rotary die may be of substantially polygonal cross-section, for example octagonal, the axes of rotation being sprung loaded towards each other. The dies may be arranged to form one capsule at a time, forming the multiplicity of recesses in succession as the dies rotate. Alternatively the dies may be arranged to form a plurality of capsules at once, side-by-side across the width of the films; for example the dies may define close packed arrays of recesses. A heater may be associated with the rotary dies, to provide heating of the films to soften them, before they are deformed to form the recesses. The films may be deformed by suction into recesses in the dies, or may be deformed into those recesses by the pressure of the filling material, although the base of each recess need not correspond to the shape of the capsule, as the films need not contact the base of the recesses during formation of the capsules.

The filling material may be a pharmaceutical, and is a preferably a liquid. Where the capsules are intended to be swallowed (for example where they contain a pharmaceutical or a nutritional supplement), the polymeric material should be ingestible. It may for example be gelatin, or a water-soluble cellulose derivative, or a starch derivative. For example it may be hydroxypropyl methyl cellulose, which is approved for use with pharmaceuticals and in food (being indicated by the code E464 in Europe). Other suitable polymeric, materials would be edible seaweed-derived polymers such as sodium alginate (E401), propylene glycol alginate (E405) or agar-agar (E406). The polymeric material must not contain any harmful or toxic additives, but may contain compounds such as glycerol (E422) or glycerol monostearate (E471) as plasticisers, these compounds also being ingestible and dispersible or soluble in water. Other suitable cellulose derivatives are hydroxypropyl cellulose (E463), and methyl ethyl cellulose (E465).

There is no requirement for any water to be added to the film, and indeed it is preferable that the films should be at least superficially dry, that is to say in equilibrium with ambient conditions. For example the film might be in equilibrium with air at a temperature of 25° C. and a relative humidity of 40%. For example it might be stored before use in a controlled humidity environment, with a relative humidity preferably in the range 30% to 70%. Under such circumstances the film would evidently incorporate some water but would appear complete dry, and such incorporated water would tend to act as a plasticiser.

During the welding process different parts of the films are heated to different temperatures, and there is subsequently a tendency for the web to deform as it cools down. Cutting out the capsules as they pass through the welding dies avoids this problem, although the cutting process may be easier once the welded seams have cooled at least slightly. Transferring the web and attached capsules directly to another die, so that the capsules remain located in recesses in one or other of the dies throughout the process, ensures that any tendency of the web to deform does not have a deleterious effect on the cutting process. Where the cutting is performed by a second pair of dies, one die of the second pair may also be one of the welding dies, or alternatively the second pair may be two additional dies.

In a further aspect, the invention provides a capsule formed by the method or apparatus of the invention.

The invention will now be further and more particularly described, by way of example only, and with reference to the accompanying drawings in which.

Figure 1:
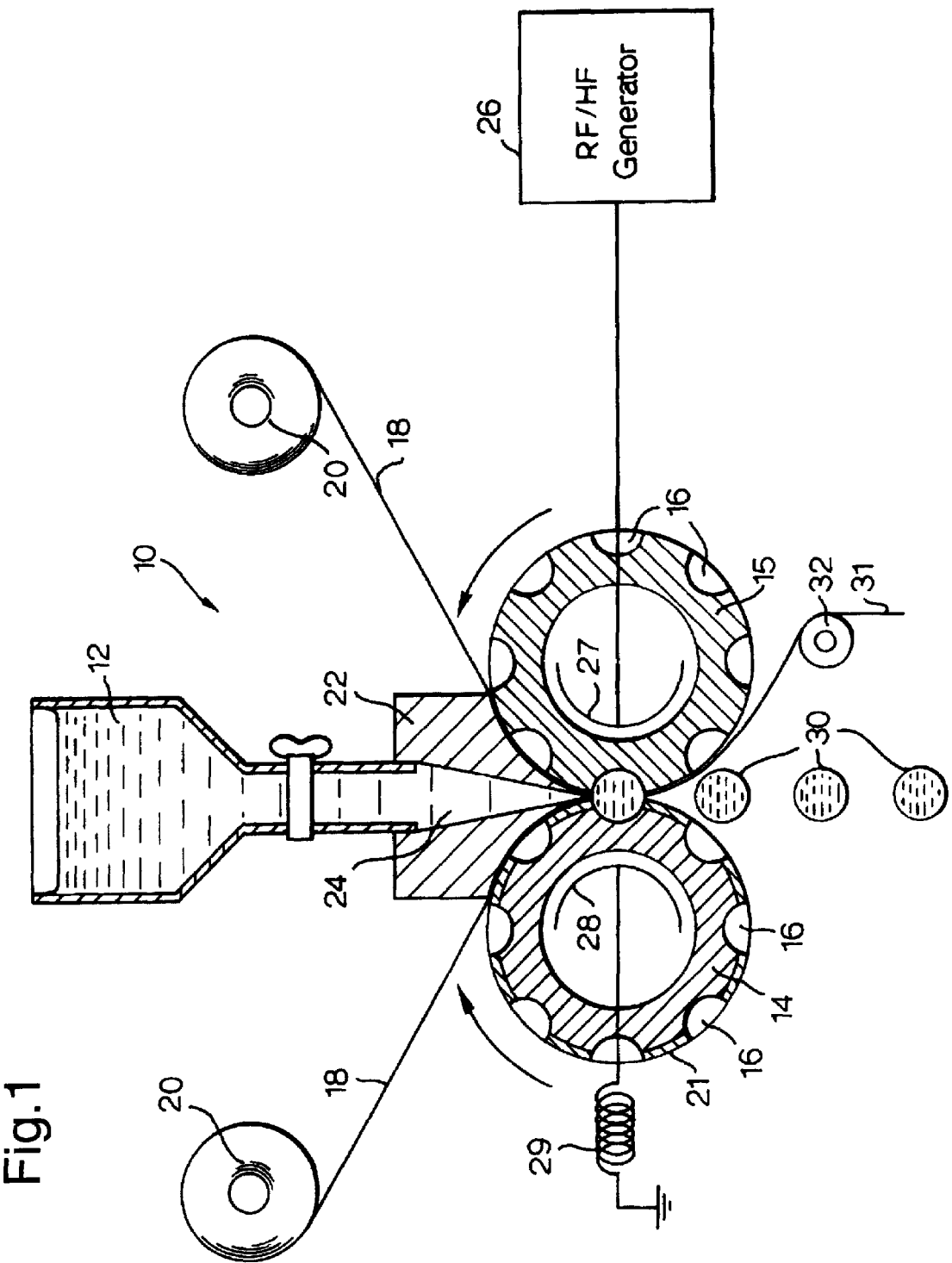
FIG. 1 shows a side view, partly in section, of an apparatus for forming capsules.

Referring to FIG. 1 this shows schematically an apparatus 10 for making capsules of an ingestible, pharmaceutical grade material, such as hydroxypropyl methyl cellulose, the capsules being filled with a non-aqueous liquid filling material 12. The apparatus comprises two adjacent rotary dies 14 and 15, each of generally cylindrical external shape, which define a plurality of oval recesses 16 in their periphery (8 recesses, as shown, along a peripheral path), the rotations of the dies 14 and 15 being synchronized so that the recesses 16 are always opposite each other. Heaters (not shown) are arranged to maintain the dies 14 and 15 at a temperature between 50 and 70° C., for example 60° C. Two sheets 18 of the polymeric material (hydroxypropyl methyl cellulose in this example) are supplied to the dies 14 and 15 from rollers 20, each sheet 18 being of uniform thickness 0.20 mm. The dies 14 and 15 are of the same length as the width of the films 18, and may have other sets of recesses spaced axially along their length. It will be appreciated that the numbers of recesses 16 around a periphery is a matter of choice, and that if there is more than one peripheral ring of recesses, then the arrangement of those recesses 16 as an array over the surface of the dies 15 and 16 is also a matter of choice; they may for example be in a close packed array. The dies 14 and 15 are hollow, defining within them narrow ducts (not shown) communicating with the base of each recess 16, and valves (not shown) whereby suction can be applied to those recesses 16 that are immediately above the pinch between the dies 14 and 15. The axes of rotation of the dies 14 and 15 are spring loaded towards each other, so the films 18 are subjected to compression as they pass between the dies 14 and 15, and are arranged so that the dies 14 and 15 contact each other immediately around each recess 16. The die 15 is of aluminium, while the die 14 is primarily of aluminium but with a surface coating 21 of electrically insulating alumina of thickness 25 µm.

Immediately above the two dies 14 and 15 is a guide block 22, the films 18 passing between the lower curved surface of the guide block 22 and the outer surface of the dies 14 and 15. The filling material 12 is pumped through ducts 24 in the guide block 22 into the gap between the films 18 just above the point where they come together, each duct 24 being aligned with one of the sets of peripheral recesses 16. The films 18 are softened by their contact with the heated surface of the dies 14 or 15, and are deformed by being sucked into the recesses 16 above the pinch point, or owing to the pressure of the filling material. Hence the filling material 12 fills the recesses 16 at this point. The guide block 22 may also incorporate means to heat the films 18.

A high frequency generator 26 is connected via a capacitative coupling 27 to the die 15, this generating an electrical current at a frequency of 27.12 MHz. The other die 14 is connected via another capacitative coupling 28 and an inductor 29 to earth potential. The capacitative coupling 28 and the inductor 29 together form a tuned circuit that has a resonant frequency at which its impedance is a minimum, the value of the inductor being selected so the resonant frequency is at (or close to) the frequency of the generator 26. In operation of the apparatus 10 the generator 26 continuously supplies this high frequency signal, so that as the films 18 pass between the dies 14 and 15 they are subjected to dielectric welding. The opposed faces of the sheets 18 become hot enough to fuse together, whereas the outer faces in contact with the dies remain at the temperature of the dies 14 and 15. Thus in operation the films 18 are welded together and simultaneously cut out as they pass through the pinch point between the dies 14 and 15. Filled capsules 30 hence emerge from below the rotary dies 14 and 15. The perforated web 31 from which the capsules 30 have been cut may be passed around a guide roller 32.

Because the polymeric material melts during the welding process, a bead of molten material forms around the the welded seam on the inside of each capsule 30, so that after the capsules have been cut out the wall thickness is slightly thicker around the seam. By way of example each capsule 30 might be of ellipsoidal shape, 10 mm long and 7 mm wide. The use of a cellulose derivative (such as hydroxypropyl methyl cellulose) for the sheets 18, and so for the walls of the capsule, has advantages in view of the proven use of such material for pharmaceutical applications, and in view of its solubility in water and its lack of toxic effects. The sealed nature of the capsules 30 allows the material 12 to be liquid, so that a wide range of pharmaceuticals can be delivered with such a capsule 30. For example, the liquid may be a solution of a pharmaceutically active material, or a medicine in liquid form, or an emulsion of pharmaceutical material in a liquid, or a pharmaceutically active oil or other liquid. It will be readily understood that the filling material 12 must be compatible with the material of the sheet 18 and in particular that water and aqueous solutions are not desirable in view of the highly soluble nature of the cellulose derivative. The filling material might alternatively be a free-flowing powder.

The solubility of the capsule walls means that the capsules will break down quickly in a patient's stomach, giving rise to a fast release of the pharmaceutical. For some applications the speed of release may be excessively fast. In that case, or for aesthetic reasons or reasons of taste and handling, the capsules might be embedded in additional material such as a sugar coating for improved taste, or a less soluble coating to slow down release.

Many variations and modifications may be made to the apparatus described above without departing from the scope of the present invention. For example three sheets might be welded together in a single operation, with recesses in the outer sheets, so that a two-compartment capsule could be produced in which each compartment held a different material. Pharmaceutical grade cellulose derivatives are highly preferred, but other materials such as gelatin may be used. The films may be of a different thickness, typically in the range 100 to 600 µm. With some films it may not be necessary to heat the dies 14 and 15. And the electrical contact to the welding dies 14 and 15 might be made by spring contacts or brushes rather than by capacitative couplings 27 and 28. Furthermore the inductor 29 may be omitted, the die 14 being connected via the coupling 28 directly to earth; and a matching network may be provided between the generator 26 and the coupling 27 to the die 15, so that the impedance presented to the generator 26 is held constant. The insulating coating 21 may be of a different material, preferably a material that is not dielectrically heated, for example PFA (perfluoro alkoxyalkane). Other suitable polymer materials are polytetrafluoroethylene (PTFE), or fluorinated ethylene propylene (FEP), or polyether-ether-ketone (PEEK). Another suitable material is electrically-insulating diamond-like carbon (DLC). The thickness of the coating 21 is typically in the range 10 to 100 µm.

Figure 2:
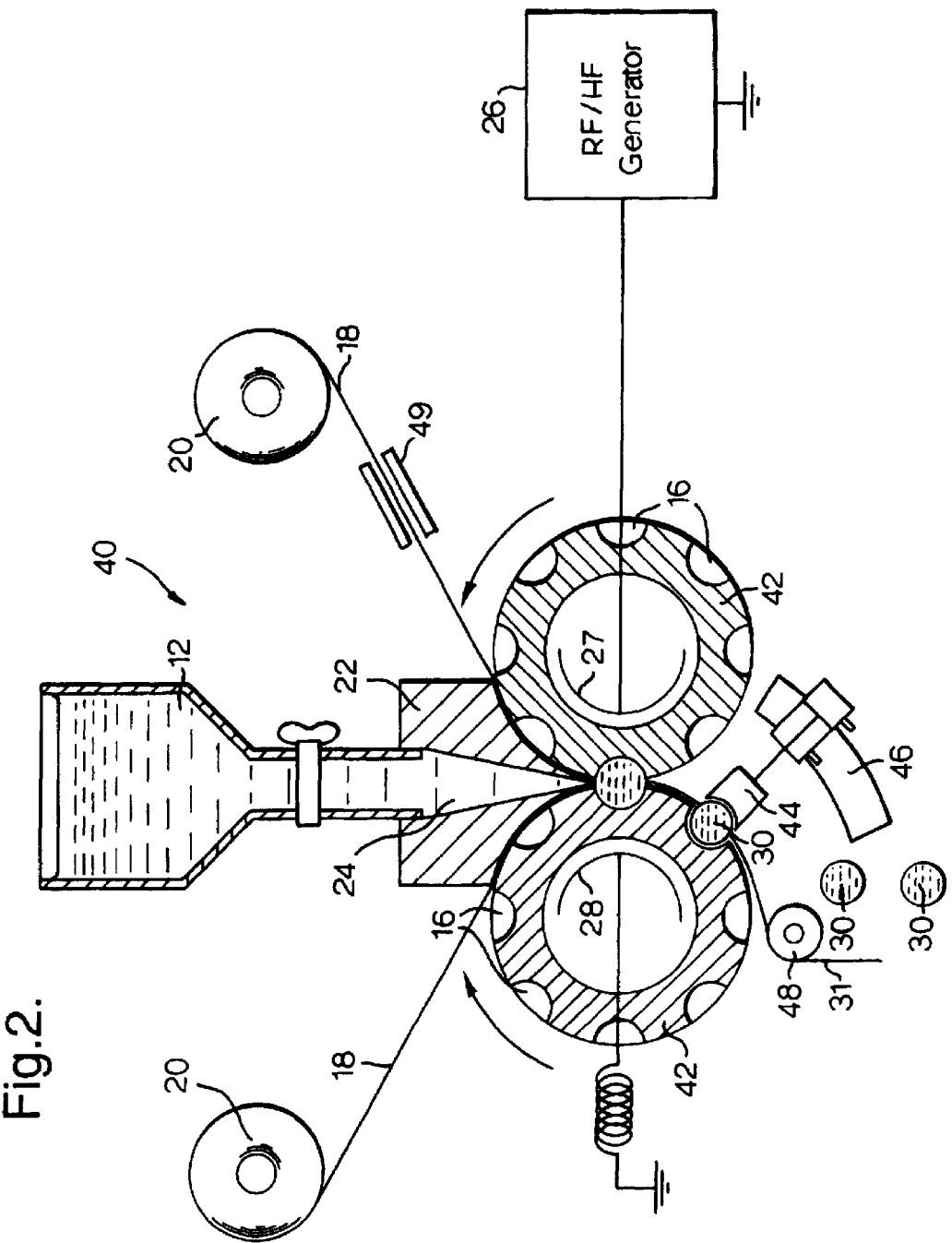
FIG. 2 shows a similar view of an alternative apparatus for forming capsules.

Referring now to FIG. 2 there is shown an apparatus 40 very similar to the apparatus 10 of FIG. 1, many of the components being identical and being referred to by the same reference numerals. In this case the welding electrodes or dies 42 are identical, both being of stainless-steel, and defining recesses 16. They are mounted in such a way that at their closest the dies 42 remain separated by the films 18, the closest separation being 0.2 mm (so that the films 18, each of thickness 0.2 mm, are compressed together during welding). As with the apparatus 10, the films 18 undergo dielectric welding as they pass through the pinch point, and an array of filled capsules 30, connected together by a web of welded films 18, emerges from the pinch point but remains located in the recesses 16 on the left hand die 42 (as shown).

A hydraulic punch 44 is arranged below the pinch point, mounted on an arcuate track 46 concentric with the left hand die 42, and is operated by a mechanism (not shown) to move downwards along the track 46 at the same angular rate as the die 42 as it punches out the capsule 30 (or an axial row of capsules 30). The punch 44 is then retracted and moved back up along the track 46 to its starting position, ready to punch out the next capsule 30. The perforated web 31 is then passed over a roller 48. A further feature, in this case, is that a printing station 49 is arranged immediately below the roller 28 to print information onto one of the sheets 18.

The apparatus 40 operates in the same way as the apparatus 10, but since the capsules 30 are not cut out until they have travelled a further distance around the die 42 beyond the pinch point, the polymeric material of the films 18 has decreased in temperature after the welding step, and the weld has therefore had sufficient time to bond securely. It will be appreciated that the welding dies 42 may be of a different material, for example of brass or aluminium. In place of the punch 44, the capsules 30 may be cut out by an ultrasonic or laser cutter.

Figure 3:
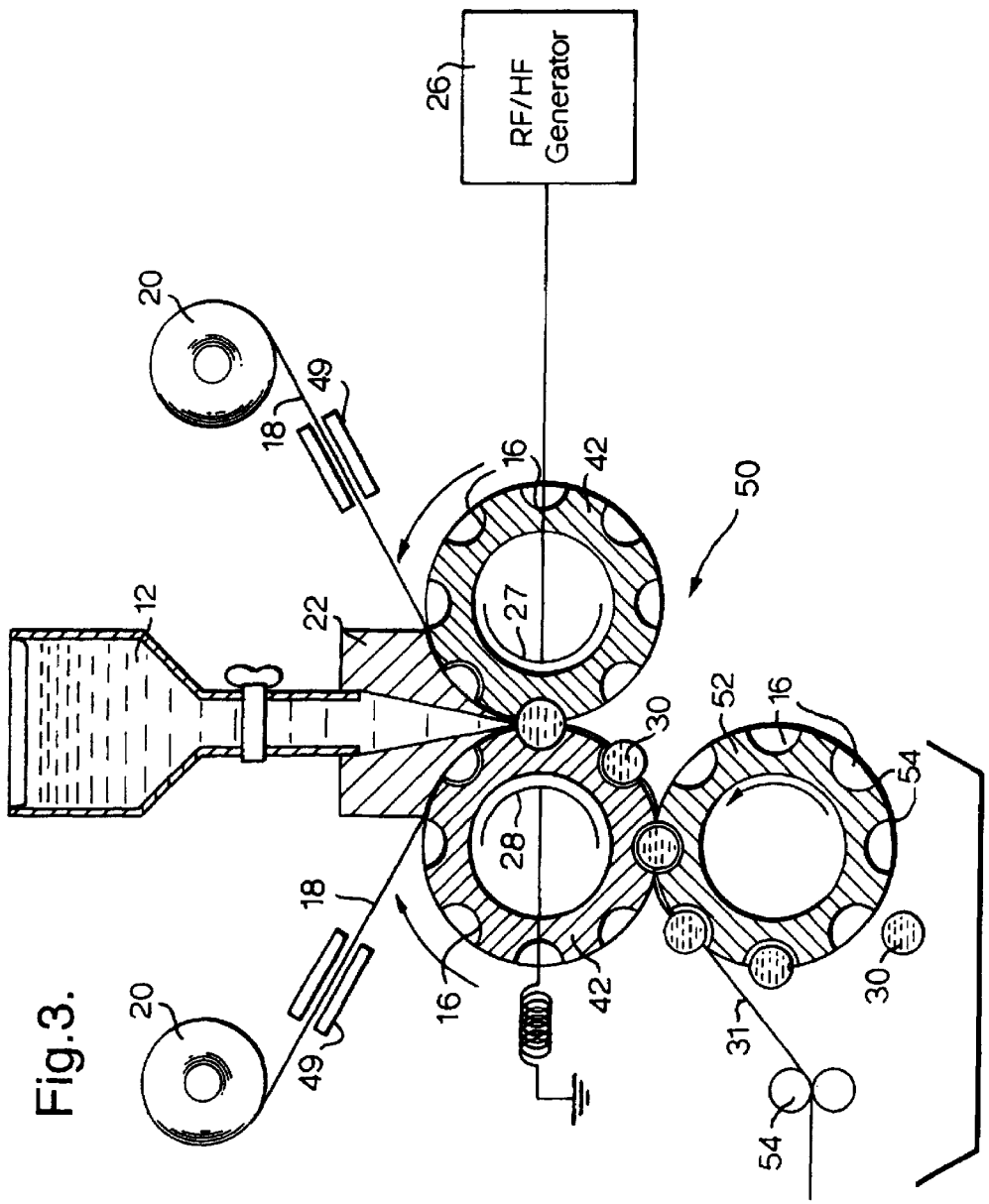
FIG. 3 shows a similar view of another alternative apparatus for forming capsules.

Referring now to FIG. 3 there is shown an apparatus 50 very similar to the apparatus 40 of FIG. 2 and to the apparatus 10 of FIG. 1, many of the components being identical and being referred to by the same reference numerals. The welding mechanism, including the electrodes or dies 42, is identical to that of FIG. 2, the dies 42 again being of stainless-steel. A kiss-cut roller 52 of stainless-steel is mounted below the left hand die 42, defining recesses 16 with sharp edges 54. The kiss-cut roller 52 is sufficiently close that it just touches the left hand die 42 around the edge of each recess 16, so cutting out the capsules 30. The kiss-cut roller 52 is preferably also connected electrically to the left hand die 42. The perforated web 31 is then passed through rollers 54.

The apparatus 50 operates in substantially the same way as the apparatus 40. Since the cutting out necessitates contact between the left hand die 42 and the kiss-cut roller 52, this arrangement is only applicable if the left hand die 42 is of a hard wearing material.

Figure 4:
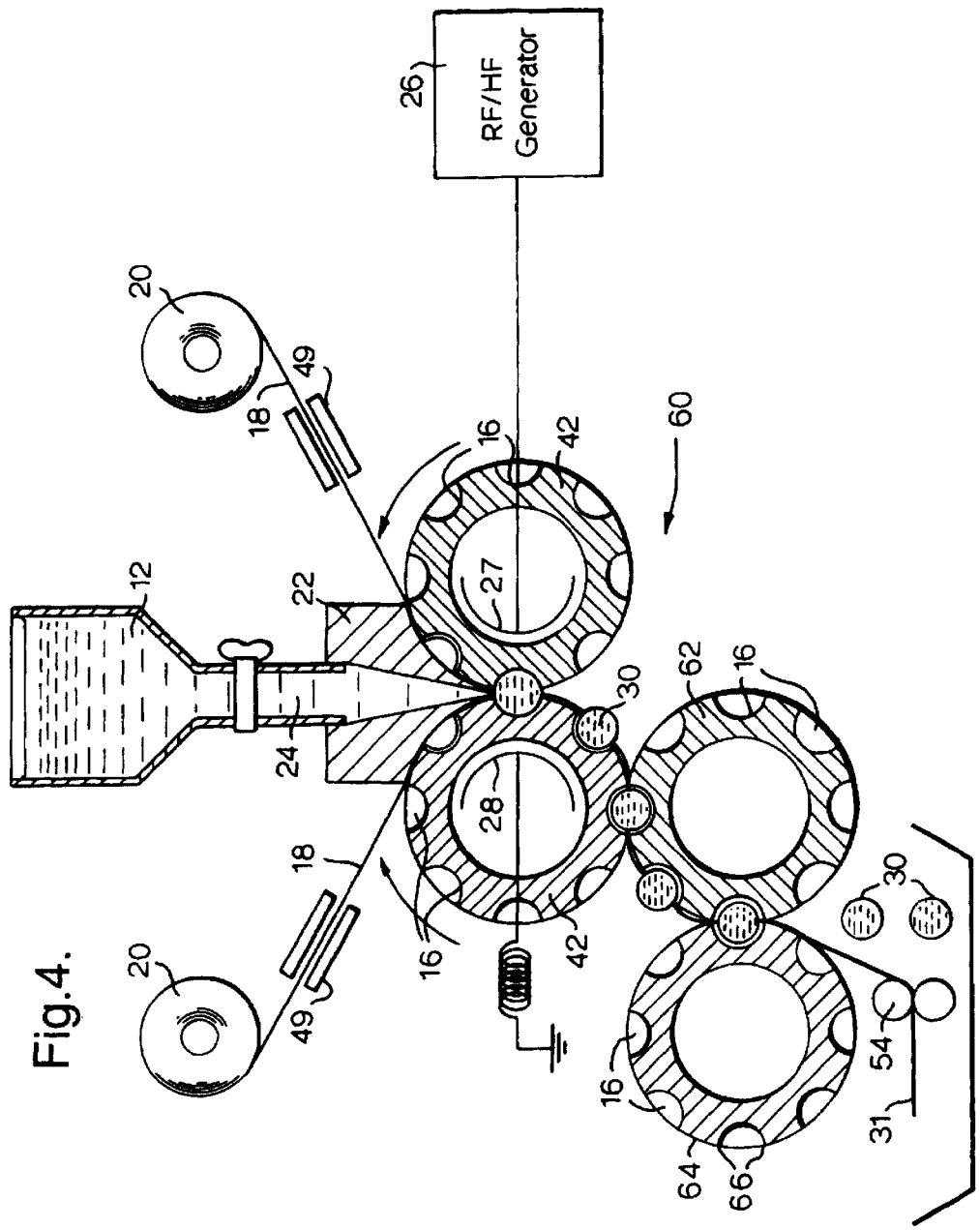
FIG. 4 shows a similar view of a modification of the apparatus of FIG. 3.

Referring now to FIG. 4 there is shown an apparatus 60 with many similarities to that of FIG. 3, many of the components being identical and being referred to by the same reference numerals. The welding mechanism, including the electrodes or dies 42, is identical to those of FIGS. 2 and 3, although the dies 42 in this case may be of materials other than stainless-steel if desired. A transfer roller 62 of stainless-steel is arranged below the left hand die 42, defining recesses 16 to locate the capsules 30. It may be desirable to apply a partial vacuum to the recesses 16 within the transfer roller 62 at the position where the transfer takes place. The transfer roller 62 does not contact the die 42.

A kiss-cut roller 64 is arranged alongside the transfer roller 62, defining recesses 16 with sharp edges 66. The kiss-cut roller 64 is sufficiently close that it just touches the transfer roller 62 around the edge of each recess 16 as they rotate, so cutting out the capsules 30. The perforated web 31 then passes through rollers 54.

The apparatus 60 welds the capsules 30 as in the previously-described apparatuses, and allows time for the welds to bond securely before cutting. As compared to the previous designs, the apparatus 60 provides the benefit that the welding dies 42 may be of any desired material, as they are not involved in the cutting process. A second benefit is that the time delay between welding and cutting is longer than with the previous designs. And a third benefit is that the cutting mechanism (the transfer roller 62 and the kiss-cut roller 64) is electrically insulated from both the welding electrodes (dies 42).

It will be appreciated that the apparatuses described above may be modified in a variety of ways. In particular, the recesses 16 have been shown in every case as having a base that is curved, shaped to conform to the shape of the capsule 30. This may be preferred in the welding dies 42 (although it is not necessary there), and it is unnecessary once the capsules 30 have been formed. Hence for example the recesses 16 in the kiss-cut roller 52 of FIG. 3, and in the transfer roller 62 and the kiss-cut roller 64 of FIG. 4, might be flat-bottom recesses instead.

The invention claimed is:

1. An apparatus for making capsules from two films of a polymeric material, the apparatus comprising a pair of rotary welding dies defining recesses, means to supply the films to the welding dies so they are deformed to form recesses, and means to fill the resulting recesses in the films with a filling material, and means to apply high frequency electrical signals between the welding dies so the films are welded by dielectric welding to form a multiplicity of enclosures containing the filling material, and means to cut the filled enclosures from the remaining parts of the films so as to form a multiplicity of capsules, wherein there is no metal-to-metal contact between the welding dies, and characterised in that the cutting occurs at a different place to the welding but the capsules remain located in recesses throughout their passage between the welding and the cutting steps, wherein the cutting is performed while the enclosures remain located in the recesses in one of the welding dies, said apparatus also comprising a transfer roller and a kiss-cut roller, the enclosures being located in recesses in the transfer roller, and the cutting being performed between the transfer roller and the kiss-cut roller.

2. An apparatus for making capsules from two films of a polymeric material, the apparatus comprising a pair of rotary welding dies defining recesses, means to supply the films to the welding dies so they are deformed to form recesses, and means to fill the resulting recesses in the films with a filling material, and means to apply high frequency electrical signals between the welding dies so the films are welded by dielectric welding to form a multiplicity of enclosures containing the filling material, and means to cut the filled enclosures from the remaining parts of the films so as to form a multiplicity of capsules, wherein there is no metal-to-metal contact between the welding dies, and characterised in that either the welding and cutting occur at the same place, metal-to-metal contact between the dies being prevented by using at least one welding die whose external surface is coated with a non-porous electrical insulator, or alternatively the cutting occurs at a different place to the welding but the capsules remain located in recesses throughout their passage between the welding and the cutting steps, wherein the cutting is performed while the enclosures remain located in the recesses in one of the welding dies.

3. An apparatus as defined in claim 2 wherein the electrical insulator is a ceramic.

4. An apparatus as claimed in claim 2 wherein the cutting is performed by a kiss-cut roller adjacent to the one welding die.

* * * * *